UNITED STATES PATENT OFFICE.

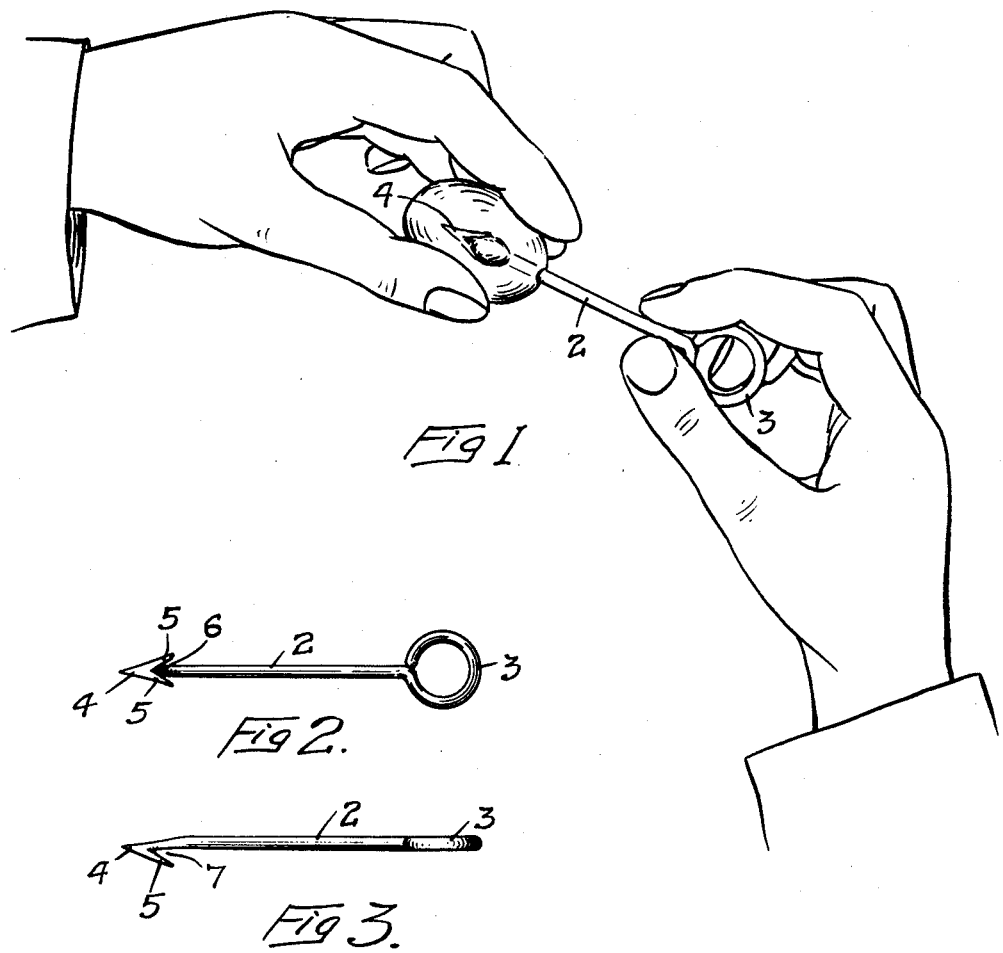

NEWELL S. GRIFFITH, OF MINNEAPOLIS, MINNESOTA.

FRUIT-SEEDER.

1,082,516.  Specification of Letters Patent.  Patented Dec. 30, 1913.

Application filed March 17, 1911. Serial No. 615,147.

*To all whom it may concern:*

Be it known that I, NEWELL S. GRIFFITH, of Minneapolis, Hennepin county, Minnesota, have invented certain new and useful Improvements in Fruit-Seeders, of which the following is a specification.

In preparing small fruit,—such as grapes, cherries, and the like, for salads, considerable difficulty is experienced in removing the seeds, the fruit being usually split with a knife and the seeds extracted with the knife point, resulting in removing also a considerable portion of the pulpy portion of the fruit.

The object of my invention is to provide a tool which can be easily and quickly thrust into the fruit and engaging a seed will remove it from the fruit when the tool is withdrawn.

The invention consists generally in a tool comprising a shank having a barbed end that is adapted to penetrate the fruit and engage the seeds when the shank is withdrawn.

In the accompanying drawings forming part of this specification, Figure 1 is a perspective view illustrating my invention in use, Fig. 2 is a plan view of the device, Fig. 3 is a side view.

In the drawing, 2 represents the shank of the tool, having a loop 3 for convenience in holding the device in the fingers and provided, preferably, at its opposite end with a pointed portion 4. In the rear of this pointed portion I provide barbs 5, preferably diverging from one another and having a recess 6 between them and a space 7 formed between them and the shank of the tool. The pointed end of the tool allows it to be thrust through the skin of a grape or cherry or similar small fruit easily and quickly, and if necessary the tool may be rotated to loosen the seeds from the pulp and then upon withdrawing the tool the barbs will engage the seed and pull it out of the fruit. The operation may be repeated until all the seeds have been removed.

As shown in Fig. 1, the tool is removing a grape seed, the tapered or pointed end of the seed fitting between the barbs of the tool and the opposite end resting on the shank so that the seed is drawn out lengthwise without pulling any portion of the pulp with it, and it will only be necessary to make a small aperture in the skin of the fruit sufficient to allow the passage of the seed. Of course, if preferred, the fruit may be split, but in either case the tool will be equally efficient for separating the seed from the pulp.

The device may be made in different sizes and the barbs of various shapes and lengths, according to the kind of fruit on which the tool is used and the size and shape of the seed.

In various other ways the details of the tool may be modified without departing from my invention.

I claim as my invention:—

A fruit seeding device comprising a shank adapted to be held in the hand and having a pointed end provided with a smooth surface, a pair of barbs formed on said shank near said pointed end and projecting rearwardly from said point and diverging from one another and from said shank, both of said barbs being located on one side of the longitudinal axis of said shank and adapted to receive a fruit seed between them, said shank being bent slightly near said barbs to set them outwardly a greater distance from said shank and provide a greater space for the fruit seed.

In witness whereof, I have hereunto set my hand this 10th day of March, 1911.

NEWELL S. GRIFFITH.

Witnesses:
GENEVIEVE E. SORENSEN,
EDWARD A. PAUL.